W. F. DANIEL.
CAR WHEEL BEARING.
APPLICATION FILED AUG. 29, 1913.
1,108,068. Patented Aug. 18, 1914.
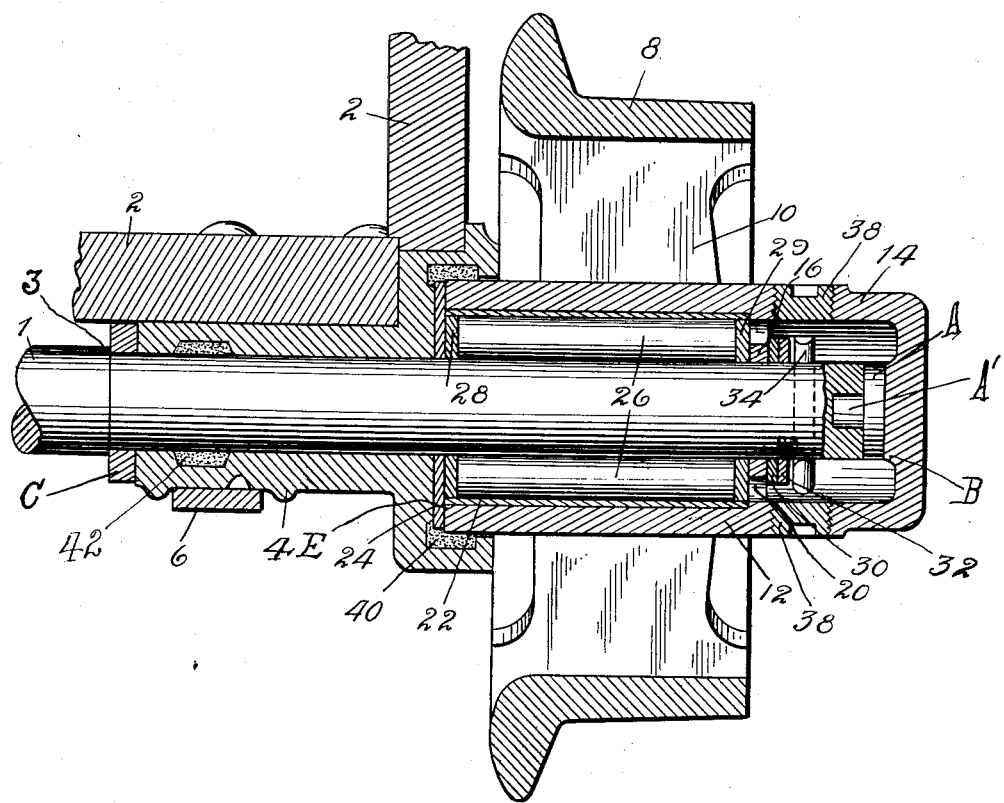
Witnesses
J. Milton Jester
W. Schornborn
Inventor
William F. Daniel,
By C. A. Mason
Attorney

UNITED STATES PATENT OFFICE.

WILLIAM F. DANIEL, OF BRISTOL, TENNESSEE.

CAR-WHEEL BEARING.

1,108,068. Specification of Letters Patent. Patented Aug. 18, 1914.

Application filed August 29, 1913. Serial No. 787,313.

*To all whom it may concern:*

Be it known that I, WILLIAM F. DANIEL, a citizen of the United States, residing at Bristol, in the county of Sullivan and State of Tennessee, have invented certain new and useful Improvements in Car-Wheel Bearings, of which the following is a specification.

This invention relates to wheels for cars, or the like, and more particularly to certain improvements in the bearings for such wheels.

A very important feature of the invention is embodied in a car wheel in which the hub has an integral oil or grease chamber which surrounds the end of the axle and communicates with the interior of that portion of the hub which surrounds the axle, and contains the usual roller bearings. The said oil chamber and hub are separated by a partition provided with openings to permit the passage of the lubricant to the bearings. Two steel washers are cast in the chamber and surround the axle, and a spring cotter pin, or similar device, passes through a perforation in the axle outside the washers and retains them in position. The provision of two washers, which are cast in the lubricating chamber, and, in addition thereto, a retaining cotter pin, has proved to be a very valuable combination in wheel bearings of this type. Where a single washer with a cotter pin has been used, it was found that the cutting due to the frictional engagement between the pin and washer, and between the washer and hub partition, soon wore out the washer and pin, and the wheel became then practically useless, as a new washer could not be inserted through the usual pipe plug openings in the oil chamber. On the other hand, the recognized advantages following from casting the steel washer in an integral hub chamber were too valuable to be abandoned. It was then discovered that by casting two washers in the chamber, when the wheel rotated the outer washer would adhere to the cotter pin and the inner washer to the partition, so that the frictional wear was practically confined to the contacting surfaces of the washers. These surfaces being machined to a high finish, the wear was thus reduced to a minimum, and the life of the car wheel bearing was lengthened many times, as compared with prior wheels of this type.

The drawing shows, in vertical section, a car wheel provided with my improved journal bearing.

Portions of the side and bottom timbers of a car are represented by 2, which are sustained by the axle housing 4, having the usual axle strap 6. The wheel tread 8 has the spokes 10, and hub 12, and the hub is extended outward beyond the end of the axle to provide an oil or grease chamber 14 which is separated from the bore of the hub proper by a partition 16, in which are the lubricating openings 20. These several parts, namely the tread, spokes, hub, lubricating chamber and partition, are all formed integral, as shown.

The cored chamber within the hub 12 is bored to receive a steel lining 22 which extends from the inner extremity of the hub up to a shoulder formed beyond the partition 16. The inner end of the hub abuts against a steel washer 24 which is between said end and the axle housing 4. Roller bearings 26 surround the axle 1 in the inner cored chamber of the hub, and washers 28, 29, are preferably interposed between the ends of the rollers and the washer 24, and partition 16, respectively.

Outside of the partition 16 and surrounding the axle 1 are two steel washers 30, 32, which are held in place by a cotter pin 34, and at preferably diametrically opposite points in the wall of chamber 14 are tapped holes to receive pipe plugs 38. The holes closed by these plugs are opposite the end portion of the axle so that cotter pins may be inserted, or removed, therethrough, and from either side of the chamber, as desired. The washers 30, 32, are cast loosely in the chamber 14, and have their adjacent faces dressed off smooth while their outer faces may, if desired, be rough. In practice, as the wheel rotates the outer face of the washer 30 will engage and adhere to the outer face of the partition 16, while the outer face of the washer 32 will engage and adhere to the cotter pin. The inner faces of the washers will thus have a movable bearing engagement, and being dressed smoothly, when properly lubricated will wear very slowly, thus greatly lengthening the life of the wheel as compared with prior wheels of this type.

The chamber 14 may contain a suitable grease or oil which will flow to the roller bearing of the axle through the openings 20.

Felt packings 40 and 42, are preferably inserted in a recess between the housing 4 and the hub 12, and in said housing around the axle, as shown, to prevent the escape of the lubricant at these points.

In order to overcome the tendency of the steel lining 22 and hub 20 to cut away the washer 24 and housing 4 the internal surface of the end portion of the hub 12 within the chamber 14 has a suitable inwardly projecting boss B having a bearing surface, and a thrust button A, of suitable long-wearing material, having a stem A' to enter a socket in the end of the axle, or otherwise secured to the axle, bears against the face of the boss B. The travel of these bearing surfaces A and B over each other prevents the wear at the point E and the consequent destruction of the washer 24, and the axle housing 4, and the life of the wheel is thereby lengthened. Also since the bearing parts A and B are inside the oil or grease chamber 14 they are thoroughly lubricated at all times and wear is thus reduced to a minimum.

In order that a round axle, with its recognized advantages, may be used with this construction without danger of lateral movement of the axle an enlargement or collar 3 is formed with or secured to the axle to provide a shoulder, which abuts against a ring C interposed between said shoulder and the inner end of the housing 4. The ring C may be secured to the axle in any suitable manner. The shoulder formed by the enlargement 3 and the ring C, near opposite ends of the axle, effectually restrains the axle from lateral movement while permitting its free rotation.

Having thus described my invention what I claim as new and desire to secure by Letters Patent of the United States is:—

1. In a wheel, the combination with a hub, a lubricating chamber integral with the hub and surrounding the end of the axle, a partition separating said chamber from the hub, a plurality of washers cast in said chamber and surrounding the axle, and means for retaining said washers on the axle.

2. In a wheel, the combination with a hub having a bore containing roller bearings, of a lubricating chamber integral with the hub and surrounding the end of the axle, a perforated partition separating said chamber from the hub, two washers cast in said chamber and surrounding the axle, and a pin in the axle outside of the washers for retaining said washers in place.

3. In a wheel, the combination with a hub, of a chamber integral with the hub and surrounding the end of the axle, a partition separating said chamber from the hub, two washers cast in said chamber and surrounding the axle, a pin in the axle outside of said washers, diametrically arranged openings in said chamber opposite said pin, and plugs closing said openings.

In testimony whereof I affix my signature in presence of two witnesses.

WILLIAM F. DANIEL.

Witnesses:
J. D. BAUMGARDNER,
GEORGIA N. WHITE.